(12) United States Patent
Yang et al.

(10) Patent No.: US 7,804,507 B2
(45) Date of Patent: Sep. 28, 2010

(54) FACE-MOUNTED DISPLAY APPARATUS FOR MIXED REALITY ENVIRONMENT

(75) Inventors: Ung-Yeon Yang, Daejeon (KR); Gun Adven Lee, Daejeon (KR); Sun Yu Hwang, Daejeon (KR); Wookho Son, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 657 days.

(21) Appl. No.: 11/638,438

(22) Filed: Dec. 14, 2006

(65) Prior Publication Data

US 2008/0024597 A1    Jan. 31, 2008

(30) Foreign Application Priority Data

Jul. 27, 2006    (KR) .................... 10-2006-0070523

(51) Int. Cl.
 G09G 5/12    (2006.01)
(52) U.S. Cl. .................................................... 345/633
(58) Field of Classification Search .................. 345/633
 See application file for complete search history.

(56) References Cited

U.S. PATENT DOCUMENTS

| 5,689,619 | A | * | 11/1997 | Smyth | 706/45 |
| 5,796,373 | A | * | 8/1998 | Ming-Yen | 345/6 |
| 6,348,916 | B1 | * | 2/2002 | Jeong et al. | 345/213 |
| 6,417,820 | B1 | * | 7/2002 | Choi | 345/8 |
| 6,433,760 | B1 | * | 8/2002 | Vaissie et al. | 345/8 |
| 6,798,443 | B1 | * | 9/2004 | Maguire, Jr. | 348/121 |
| 7,460,125 | B2 | * | 12/2008 | Yang et al. | 345/473 |
| 7,464,010 | B2 | * | 12/2008 | Yang et al. | 703/2 |
| 2004/0135744 | A1 | * | 7/2004 | Bimber et al. | 345/32 |
| 2006/0132915 | A1 | * | 6/2006 | Yang et al. | 359/463 |

FOREIGN PATENT DOCUMENTS

| KR | 10-1999-0021535 | 3/1999 |
| KR | 10-1999-0021540 | 3/1999 |
| KR | 10-0265496 | 6/2000 |
| KR | 10-0283933 | 12/2000 |
| KR | 20-0304507 | 2/2003 |
| KR | 10-0438816 | 6/2004 |
| KR | 10-2006-0068508 | 6/2006 |
| WO | 03/039358 | 5/2003 |

OTHER PUBLICATIONS

Szalavari et al. ", "Studierstube": An Environment for Collaboration in Augmented Reality"vol. 3, No. 1 Mar. 1998, pp. 37-48.*
Gazetracker: software designed to facilitate eye movement analysis Chris Lankford Nov. 2000 Publisher: ACM. Dept. of Systems Engineering, Olsson Hall, University of Virginia, Charlottesville, VA Chris Lankford.*

* cited by examiner

*Primary Examiner*—Javid A Amini
(74) *Attorney, Agent, or Firm*—Lowe Hauptman Ham & Berner LLP

(57) ABSTRACT

A display apparatus for a mixed reality environment includes an image processor for mixing an actual image of an object around a user and a artificial stereo images to produce multiple external image signals, a user information extractor for extracting the user's sight line information including the user's position his/her eye position, direction of a sight line and focal distance; an image creator for creating a stereo image signal based on the extracted user's sight line information; an image mixer for synchronously mixing the multiple external image signals and the stereo image signal; and an image output unit for outputting the mixed image signal to the user.

11 Claims, 9 Drawing Sheets

FACE-MOUNTED DISPLAY APPARATUS FOR MIXED REALITY ENVIRONMENT

FIELD OF THE INVENTION

The present invention relates to a display apparatus for a mixed reality environment; and, more particularly, to a face-mounted display apparatus for a mixed reality environment.

BACKGROUND OF THE INVENTION

In a virtual reality (VR) interface field, computer stereo image creation technology basically employs a stereo display technique in which different image information is provided to user's left and right viewing to obtain a stereoscopic feeling. And, VR visual interface systems can be classified into a wide screen based stereo visual system for multiple users and a portable stereo visual system for personal users.

The wide screen based stereo visual system includes a projection module that outputs large scale images, a screen module on which the image is projected, and left and right viewing information separation modules that provide binocular viewings, e.g., a project-attached polarizing filter, stereo glasses, and the like. This system has been used for multiple users seeking to enjoy stereo image contents simultaneously in a VR environment such as a theme park or a widescreen stereo movie theater.

A typical example of the portable stereo visual system for personal users is a head-/face-mounted display (HMD/FMD) device. The HMD/FMD device has a construction that combines a micro display unit (for example, a small monitor, an LCOS (liquid crystal on silicon), etc.) with an optical enlargement structure similar to glasses, and receives image information of separate modules for each of the left and right eyes and two channels for a stereo visual display. This HMD/FMD device has been employed in environments that displays private information or in situations that require a high degree of freedom of body movement such as in a mobile computing.

In a stereo image creation technology, designated information is extracted from a user and used as an input value to create images reflecting an accurate stereoscopic feeling. Typically, an eye tracking technique that tracks a head motion or user's visual information is used to create accurate stereo images. In an ergonomics evaluation test, the motion of the user's pupils is tracked by using computer vision technology, or tracking elements are attached directly to the corneas of the eyes in a shape of contact lens in order to track the position of an object viewed by the user. There are commercialized technologies capable of tracking sight line direction with an accuracy of less than 1 degree by virtue of the above-mentioned techniques.

Each of today's visual interface units that visualize stereo image contents is designed to be suitable for used in individual environments that are restricted in their own ways. Therefore, these visual interface units have limitation when applying to a variety of stereo image contents, and large scale visualizing systems can provide information only at a single identical viewpoint to its users.

In a virtual space cooperation environment, it is improper for the existing stereo visual display units that output a single stereo image to utilize public or shared information and private information simultaneously. A hologram display device, which presents the natural sense of depth that each object occupies a space like a real object, has been recognized as an idealistic stereo image visual unit. However, such a hologram display device is mostly only used for special effects in movies or manufactured as a prototype in laboratories of the aerospace field, and it is yet to provide a satisfactory result for general users.

Meanwhile, due to the development of stereo image technology, a stereo image display device is being generalized in the form of a stand-alone platform. In the near future, mobile/wearable computing technology will be able to generalize a personal VR interface unit such as a see-through type FMD and also an interactive operation by mixing personal and public virtual information. Therefore, a new technology is required to naturally mix two or more stereo image space information types and present them to a desired user, but no corresponding result has been provided yet.

SUMMARY OF THE INVENTION

It is, therefore, an object of the present invention to provide a face-mounted display (FMD) apparatus, which matches image information created from an actual image and a plurality of artificial images to a single three-dimensional virtual space, and provides the same to a user.

In accordance with the present invention, there is provided a display apparatus for a mixed reality environment, including: an external image processor for mixing an actual image of an object around a user and a single or plurality of artificial stereo images artificially created to provide a multiple external image signal; a user information extractor for extracting the user's visual information; an image creator for creating a stereo image signal based on the extracted user's visual information; an image mixer for synchronizing the multiple external image signal and the stereo image signal; and an image output unit for outputting the mixed image signal to the user for displaying thereof.

BRIEF DESCRIPTION OF THE DRAWINGS

The above and other objects and features of the present invention will become apparent from the following description of preferred embodiments, given in conjunction with the accompanying drawings, in which.

DETAILED DESCRIPTION OF THE PREFERRED EMBODIMENTS

Hereinafter, preferred embodiments of the present invention will be described with reference to the accompanying drawings.

Figure 1:
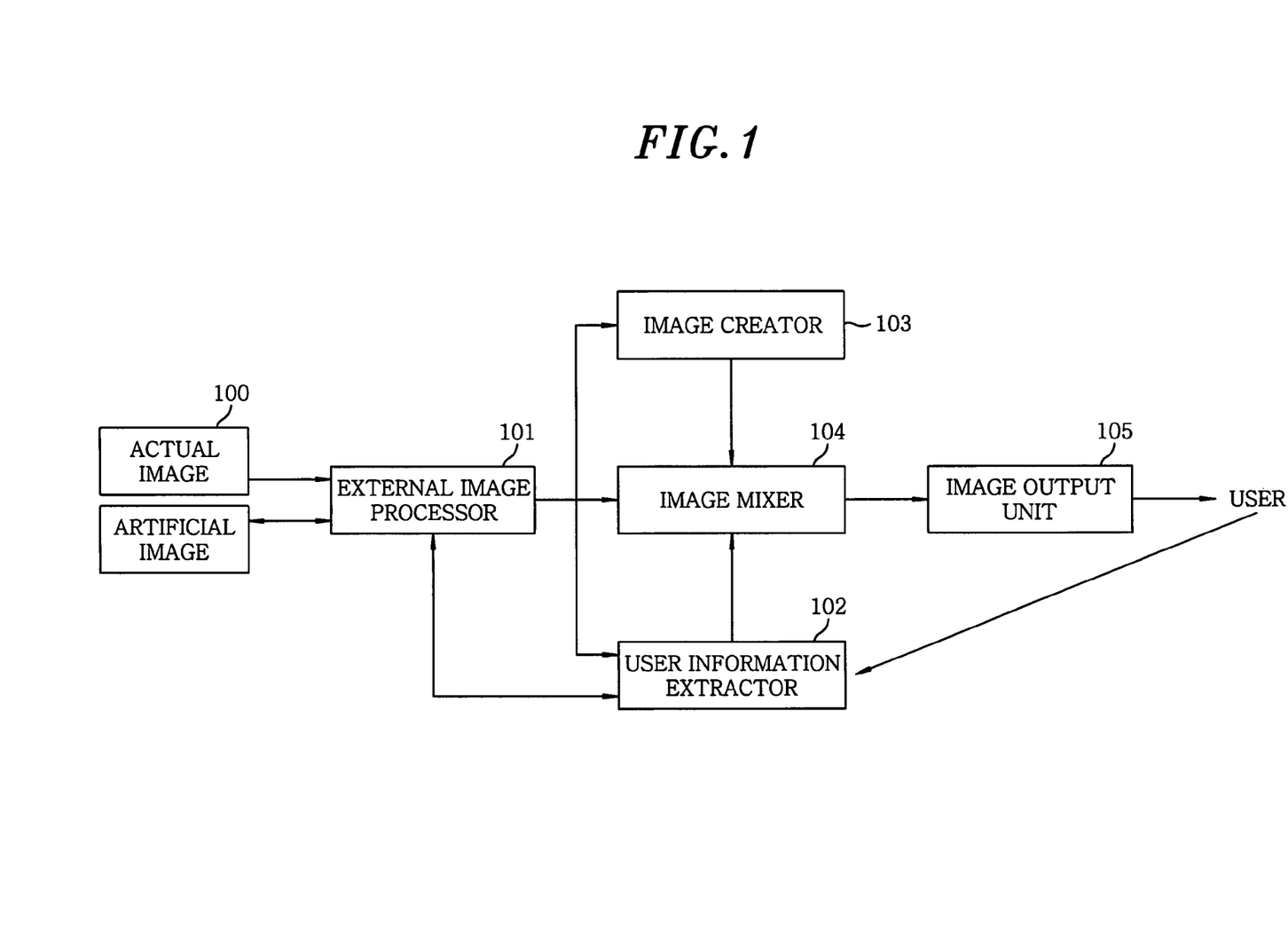
FIG. 1 is a block diagram illustrating a display apparatus for a mixed reality environment in accordance with the present invention.

FIG. 1 shows a block diagram illustrating a display apparatus for a mixed reality environment in accordance with the present invention. As shown in FIG. 1, the display apparatus for a mixed reality environment includes an external image processor 101, a user information extractor 102, an image creator 103, an image mixer 104, and an image output unit 105.

The external image processor 101 mixes a real image of surroundings of a user and a single or a plurality of artificial stereo images artificially created, to thereby provide a multiple external image signal to the image mixer 104. More specifically, the external image processor 101 performs a see-though process on various image information inputted from at the outside in order to mix them with image information created within the display apparatus by using user's visual information. In this case, it is preferable that the external image processor 101 separates the mixed signal into left and right viewing channels and then output the separated signals.

The user information extractor 102 extracts user's visual information such as user's position and his/her eye position, direction of a sight line, and focal distance, and provides the same to the external image processor 101, the image creator 103 and the image combiner 104.

The image creator 103 creates a stereo image signal based on the user's visual information and the predetermined content, the visual information being extracted by the user information extractor 102 or inputted in advance.

The image mixer 104 synchronously mixes the multiple external image signals and the stereo image signals according to the user's visual information. In order to visualize the multiple external image signals and the stereo image signal, which have been visualized on different three-dimensional spaces, on a certain three-dimensional space, it is preferable that the image mixer 104 separates the external image signals and the image signals created within the display apparatus into layered spaces in a depth direction on a basis of the stereo image signal, and then mixes them.

The image output unit 105 outputs the mixed image signals made by the image mixer 104 to the user. Preferably, the image output unit 105 outputs the mixed image signal after separating them into left and right viewing channels.

In accordance with the present invention, it is also preferable that the display apparatus for a mixed reality environment as described above be implemented as a face-mounted display (FMD).

Figure 2:
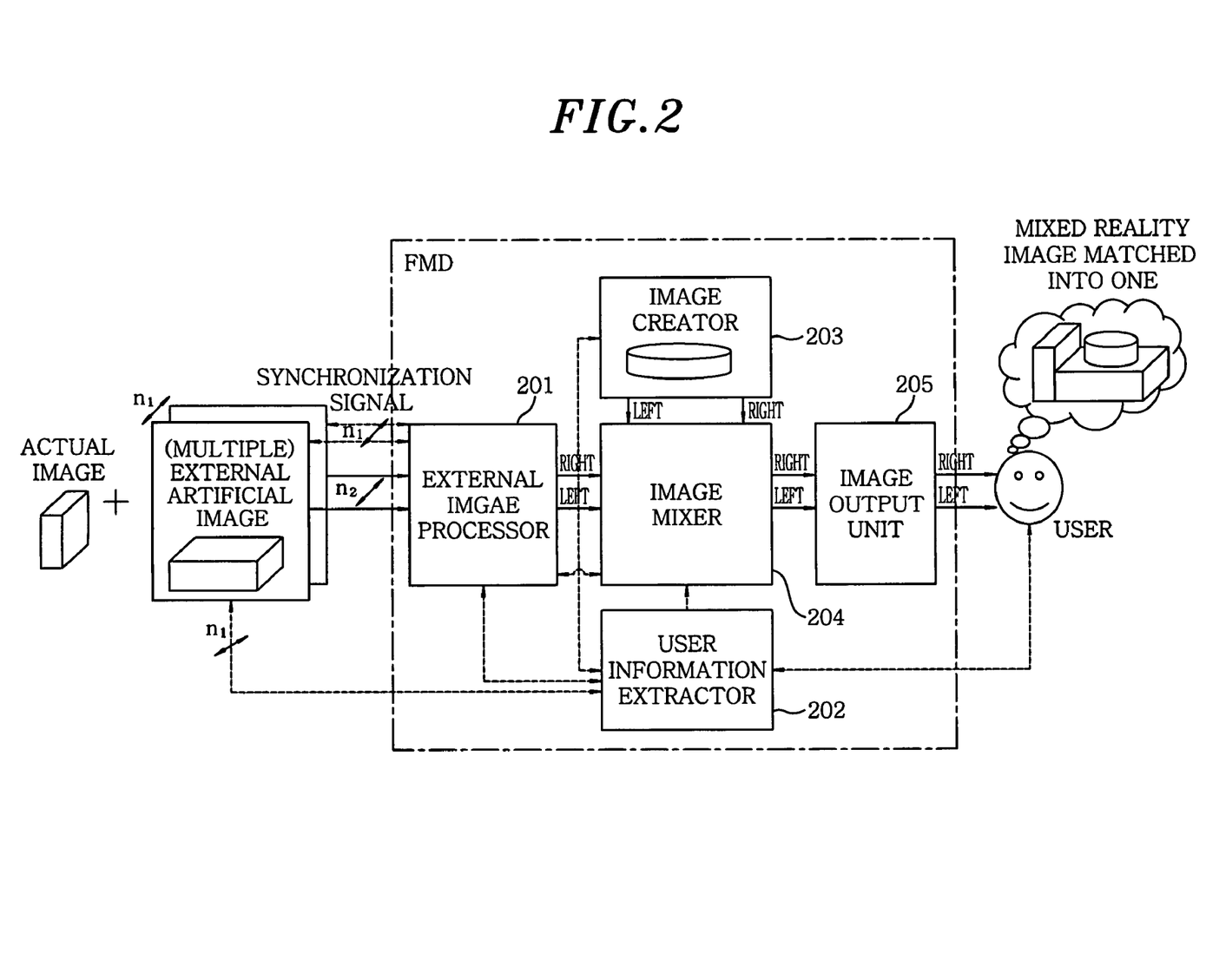
FIG. 2 provides an exemplary diagram illustrating the display apparatus in accordance with the present invention along with the flow of main image data and main control information.

FIG. 2 is a schematic diagram illustrating the display apparatus for a mixed reality environment in accordance with the present invention, wherein the flow of main image data is depicted along with main control information. As shown in FIG. 2, the display apparatus includes an external image processor 201, a user information extractor 202, an image creator 203, an image mixer 204, and an image output unit 205. These components shown in FIG. 2 carry out the substantially same functions as their respective corresponding components shown in FIG. 1.

In short, the external image processor 201 alternately exchange synchronization signals with n1-number pairs of external stereo (i.e., left and right) images. Further, the external image processor 201 serves to receive n2-number of external images, separate them into n1-number pairs of left and right viewing channels, and provide the same to the image mixer 204.

The user information extractor 202 extracts user's visual information required for creation of a stereo image signal, and provides it to the image creator 203 and the image mixer 204 as input data for creation and mixture of a face-mounted display image.

Figure 3:
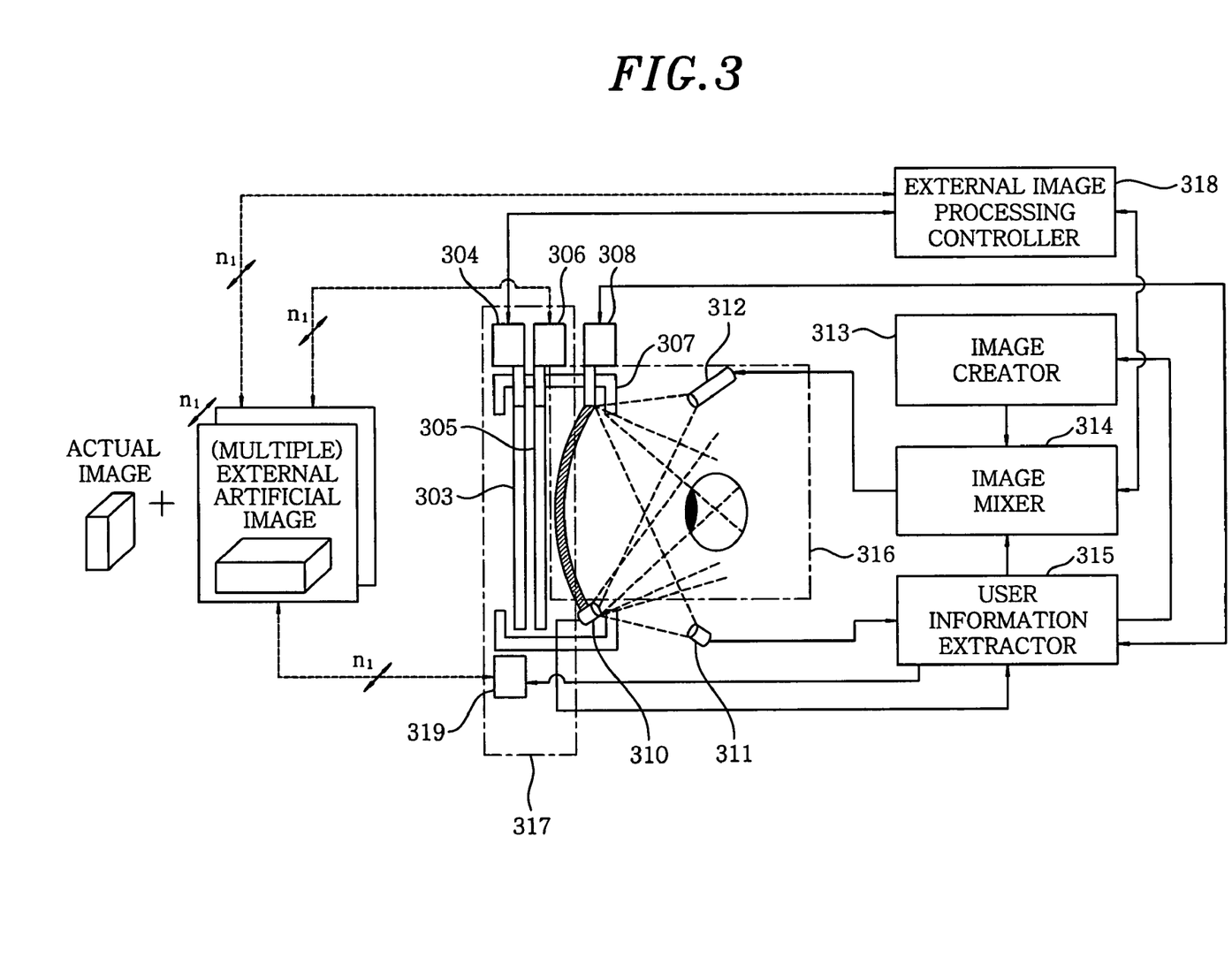
FIG. 3 shows a schematic diagram illustrating an optical see-through type display apparatus for a mixed reality environment in accordance with a preferred embodiment of the present invention.
Figure 4:
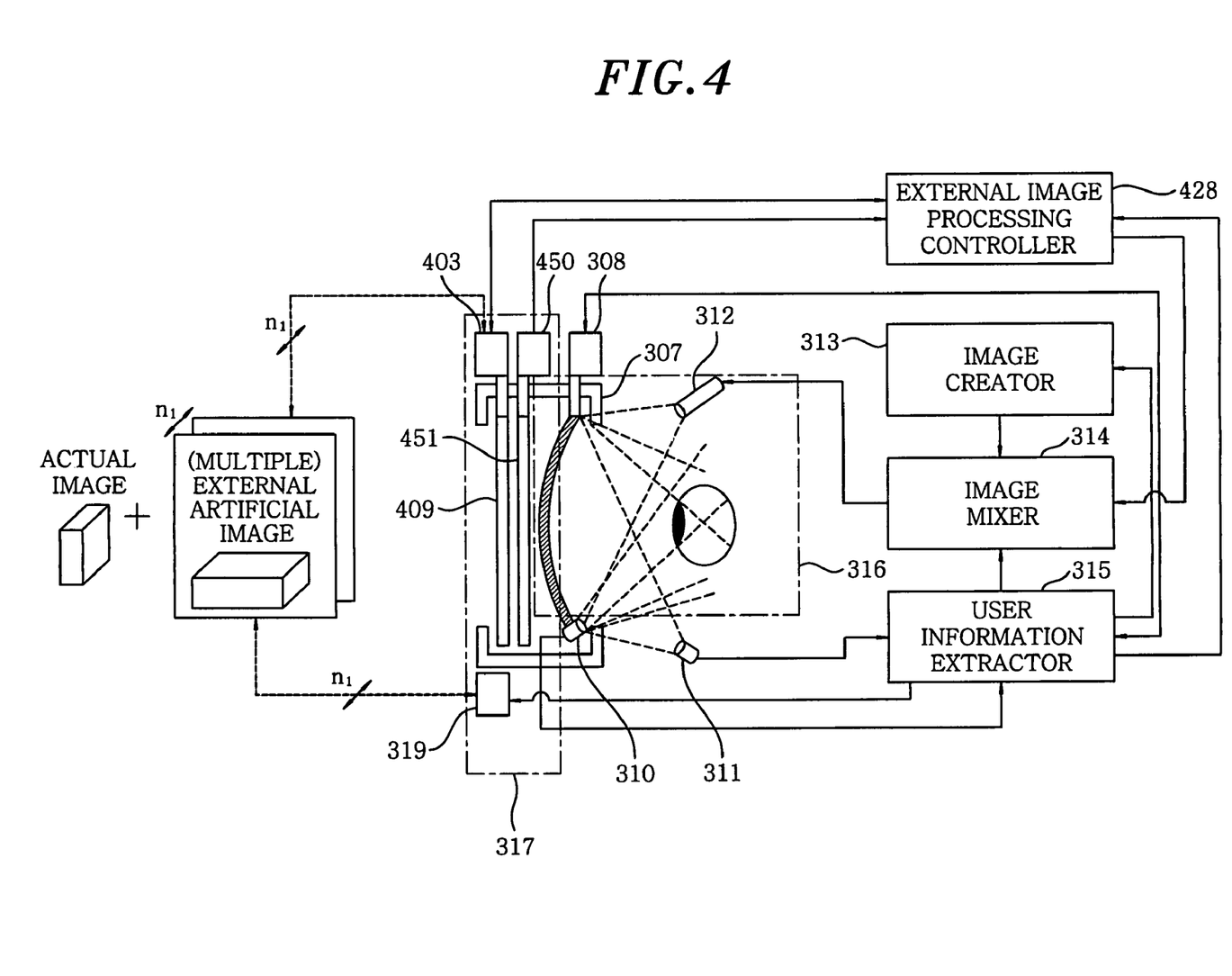
FIG. 4 offers a schematic diagram illustrating a video see-through type display apparatus for a mixed reality environment in accordance with another preferred embodiment of the present invention.

The display apparatus of the present invention can be implemented in an optical see-through type shown in FIG. 3 and a video see-through type shown in FIG. 4.

First of all, referring to FIG. 3, there is illustrated an optical see-through type display apparatus for a mixed reality environment in accordance with a preferred embodiment of the present invention. As depicted in FIG. 3, the optical see-through type display apparatus includes an external light transmission amount regulator 303, a transmittance controller 304, a left and right visual information separator panel 305, a left and right viewing information separation controller 306, an outer frame 307 of the display apparatus, a tracking sensor 308, first and second sight line information acquisition units 310 and 311, a mixed image output unit 312, an image creator 313, an image mixer 314, a user information extractor 315, an image output unit 316, an external image processor 317, an external image process controller 318, and an sight line information provider 319.

The external light transmission amount regulator 303 regulates the mixing ratio of the amount of light (e.g., the brightness of light) at the outside of the display apparatus of the present invention and the amount of light produced inside the display apparatus in the optical see-through process.

The transmittance controller 304 measures the amount of light at the outside of the display apparatus of the invention in order to support the function of the external light transmission amount regulator 303. It then transmits the measured amount of light to the external image process controller 318, or controls the overall transmittance of the external light transmission amount regulator 303 and the transmittance of each pixel based on external light amount transmission information determined by the external image process controller 318.

The left and right viewing information separator panel 305 serves to separate an external stereo image into left and right viewing information, and selectively presents external stereo image information to a left and right viewing device by means of a method similar to an artificial stereo image creation method.

The left and right viewing information separation controller 306 controls the operation of the left and right viewing information separation panel 305. Specifically, the left and right viewing information controller 306 exchanges required information (for example, left/right signal separation or synchronization information) based on the stereo image creation technique of the external image processor 317. Further, the left and right viewing information controller 306 halts the function of the left and right viewing information separation panel 305 in case of an external image being a mono image.

The outer frame 307 of the display apparatus has a scheme that can selectively attach/detach the external light transmission amount regulator 303, the transmittance controller 304, the left and right viewing information separation panel 305, the left and right viewing information separation controller 306, and the tracking sensor 308 thereto/therefrom.

The tracking sensor 308 is for calculating a sight line position of the user, who is wearing the display apparatus of the present invention, wherein a calculated position value is sent to the user information extractor 315.

The first and the second sight line position information acquisition units 310 and 311 serve to acquire sight line position information of the wearer of the display apparatus of the present invention. The technology of acquiring the sight line information is similar to that of the existing eye-tracking technology, the first sight line information acquisition unit 310 directly acquires the user's sight line information by using the light source of an image to be presented by the mixed image output unit 312. Therefore, it has an advantage of mounting an image acquisition device in an enclosed space near one's eyes.

The second eye information acquisition unit 311 extracts desired information by using a method of acquiring reflected image information and transmits it to the user information extractor 315. Accordingly, there are some advantages in that it can satisfy the requirements (such as security of the distance of an optical system) of acquiring clear and high quality image information and also share the components of the image output unit.

The mixed image output unit 312 is used to output a final mixed image created in the image mixer 314. For example, it is possible for a small-sized projection system manufactured by a set of lenses, to project the mixed image into free spaces arranged between the lenses and user's eyes within the display apparatus, thereby presenting the image information to the user's eye.

The image creator 313 creates user-customized image information. That is, a personal image can be created based on the information extracted by the user information extractor 315 and the information of contents to be presented.

The image mixer 314 mixes an external image and a personal image into one three-dimensional image on the basis of the information provided from the image creator 313, the user information extractor 315, and the external image process controller 318. In order to combine virtual and actual objects, which have been visualized on different three-dimensional spaces, onto one three-dimensional space, a virtual space is divided into layer spaces, where each apparatus is in charge of, in a depth direction on the basis of user's sight line, for mixing them, or the virtual objects and the real objects are mixed into one image information by using a depth-buffer algorithm.

The user information extractor 315 extracts personal information for creating a stereo image optimized for an individual user. Information associated with a user's sight line position, posture, direction of the sight line, etc. acquired from the tracking sensor 308, and the first and the second eye information acquisition units 310 and 311 are transmitted to the tracking sensor 308, the image mixer 314, and the eye information provider 319 as input values.

The image output unit 316 performs the same function as the image output units 105 and 205 shown in FIGS. 1 and 2. That is, the image output unit 316 outputs the mixed image signal made by the image mixer 314 to the user.

The external image processor 317 executes the function of the external image processor 101 shown in FIG. 1, as well as the function of the external image process controller 318.

The external image process controller 318 controls a transmittance amount of an entire or a specific portion of an external image by using the transmittance controller 304 based on the information provided by the image mixer 314. That is, the controller 319 allows images within the display apparatus of the present invention and external images, which are provided to the mixed image output unit 312 by acquiring a depth value of external image information, to be mixed naturally (e.g., at an equal brightness) in an optical sense for a correct mixture in the image mixer 314. The eye information provider 319 transmits user's eye information to any unit where the user's eye information is requested at the time of synchronization.

FIG. 4 illustrates a video see-through type display apparatus for a mixed reality environment in accordance with another preferred embodiment of the present invention. Most of the functional units of the video see-through type display apparatus shown in FIG. 4 are similar to those of the optical see-through type display apparatus as described in FIG. 3.

The difference therebetween is that a left and right viewing information separation controller 408 and a left and right viewing information separation panel 409 perform the same functions as the left and right viewing information separation controller 306 and the left and right viewing information separation panel 305, as shown in FIG. 3.

Designated by reference numeral 450 is a camera module controller that adjusts a shooting direction of a camera in response to a control command provided by a controller 428.

The controller 428 controls the left and right viewing information separation controller 408 and the camera module controller 450, which drive external image acquisition modules 409 and 451.

Most operations of the video see-through type display apparatus for a mixed reality environment shown in FIG. 4 is similar to that of the optical see-through type display apparatus for a mixed reality environment as shown in FIG. 3. Basically, the video see-through type shown in FIG. 4 are different from those optical see-through type in that a certain sensor technique, rather than an optical method using a human's natural vision, is used when external images are required and mixed with internal images. In the video see-through type, an external image acquisition module (for example, a small-sized camera) 451 is utilized to acquire an external image. Further, the external image process controller 428 controls the camera module controller 450 by using the information extracted by the user information extractor 315 in order to interface the camera and a user's eye, thereby controlling a convergence angle of the external image acquisition module 451.

Figure 5:
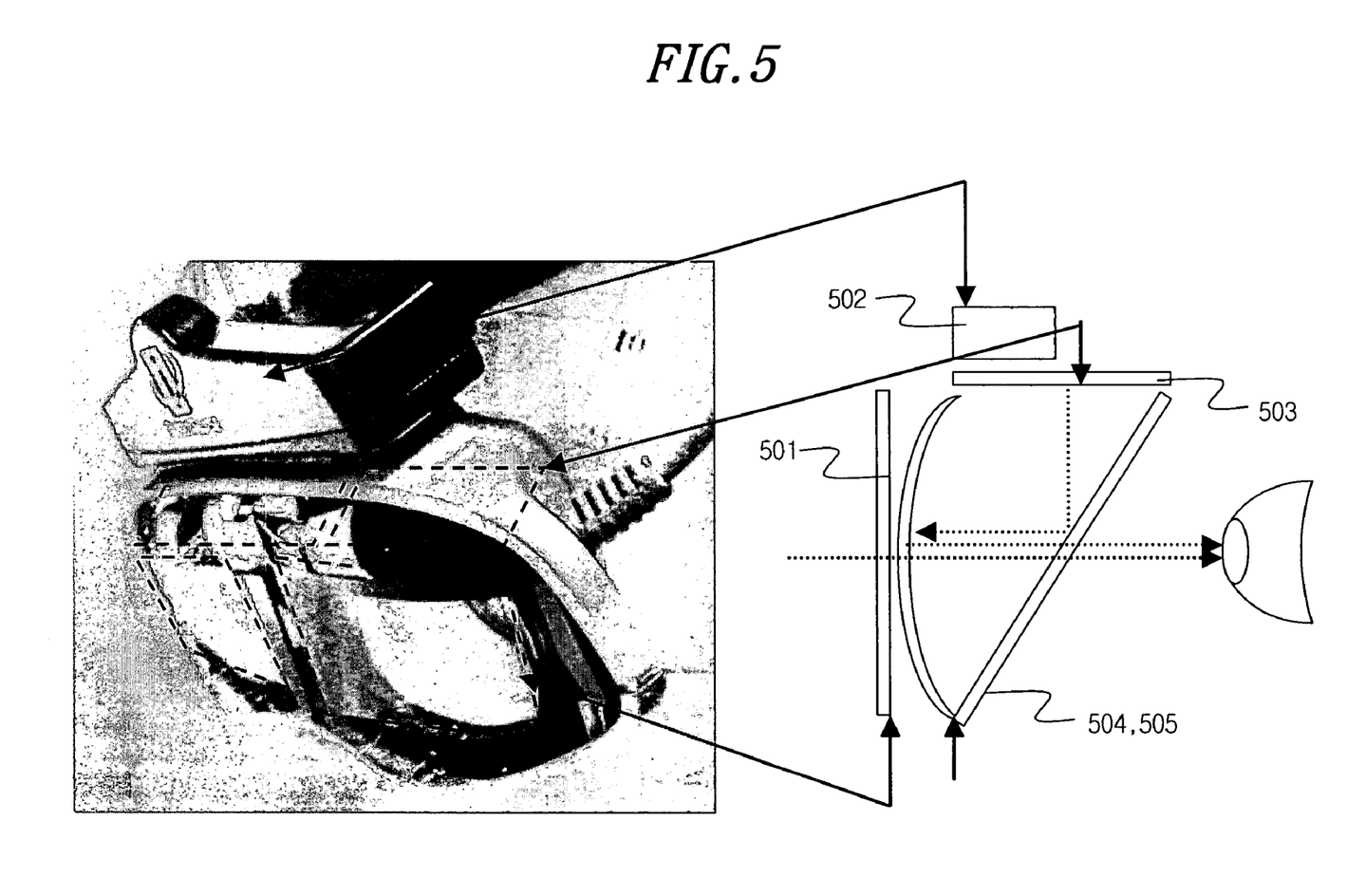
FIG. 5 exemplifies a prototype of the optical see-through type display apparatus shown in FIG. 3.

FIG. 5 shows an example of the optical see-through type display apparatus for a mixed reality environment in accordance with the present invention. The optical see-through type display apparatus includes a sensor 502 for tracking a user's head motion and a linear polarizing film 501 for selectively seeing through an external stereo image. In addition, the optical see-through type display apparatus further includes an image creator 503, a multiple stereo image mixed processing unit 504 and a multiple stereo image mixed presentation unit 505 having a semitransparent reflecting mirror and a lens, a user's head (eye) motion (posture) tracking sensor 506, and a final end personal stereo image creator 507.

Figure 8:
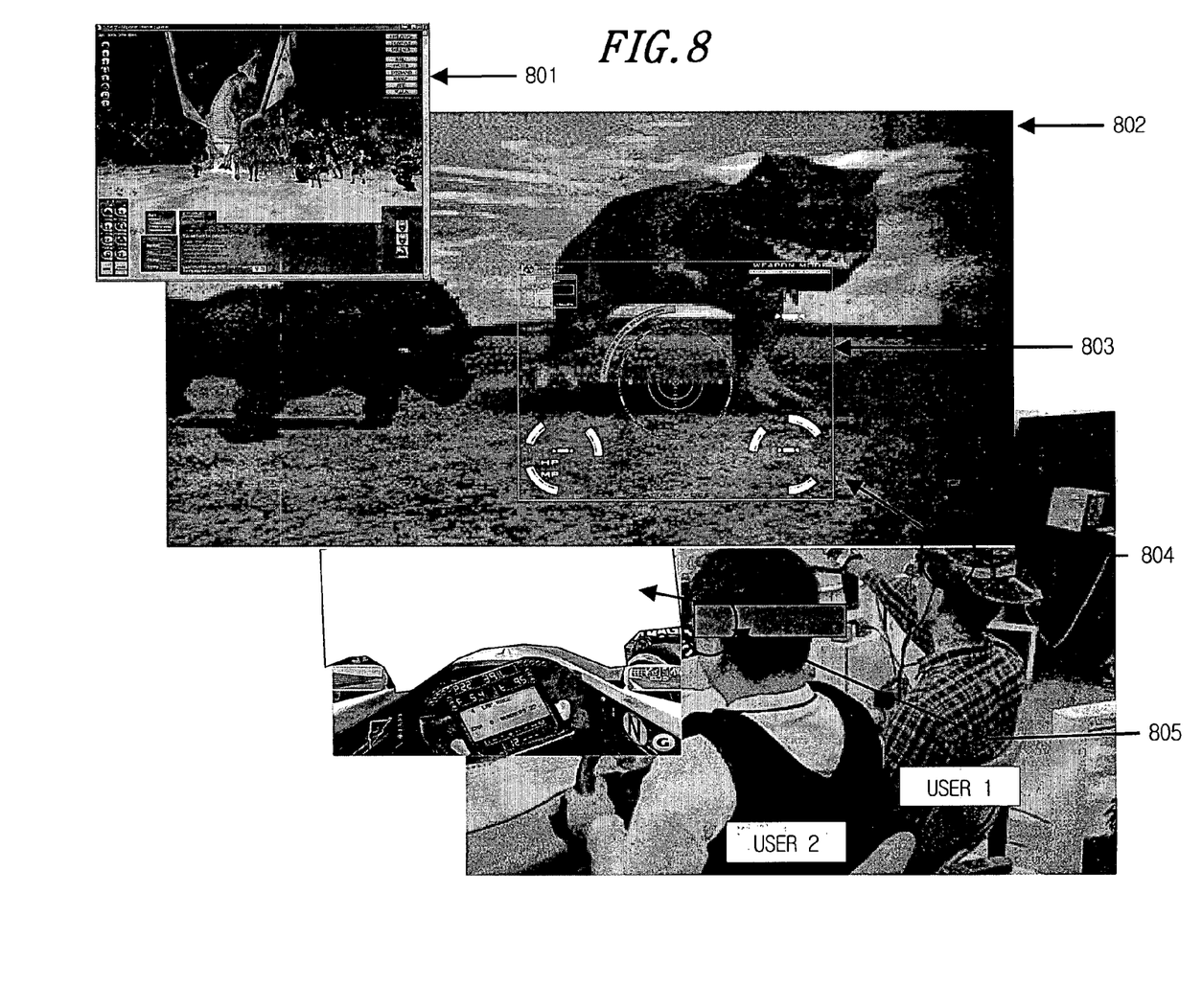
FIG. 8 illustrates an example where the display apparatus according to the present invention is implemented as an interface apparatus of virtual reality game contents allowing a multiple user participation.

By using the display apparatus according to the present invention, as shown in FIG. 8, the user is able to combine a stereo image related to his/her own personal interface and a stereo image of external contents into a single space and then view the combined image simultaneously, and the problem of private possession and share of information, which has been difficult to overcome in a multiple user participation game, can be solved.

Figures 6A, 6B:
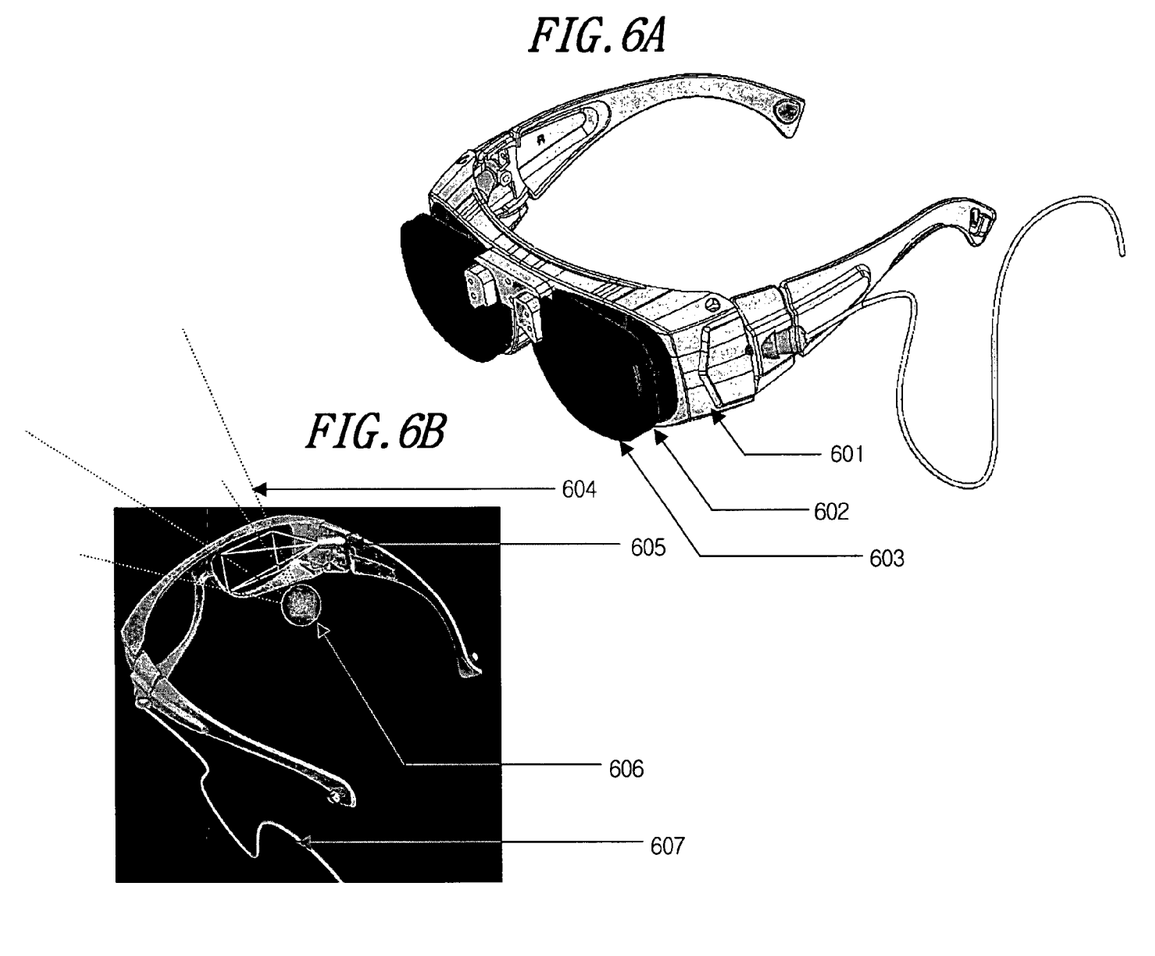
FIGS. 6A and 6B illustrate an example of the display apparatus for a mixed reality environment in accordance with the present invention.

FIGS. 6A and 6B illustrate an example of the implementation of the display apparatus according to the present invention. By virtue of the display apparatus shown in FIG. 6A, a face-mounted display apparatus can be implemented, and thus, it is possible to view an image in which an actual image and an external image are naturally mixed. The display apparatus of the present invention includes a main body 601, an external stereo image processor (optical stereo image filter) 602, and an external light transmission amount regulator 603. As illustrated in FIG. 6B, when the display apparatus of the present invention is viewed from a user's eye position, a magnified virtual image 604 formed by a final end optical unit is formed on a user's eyeball 606 by an image projection device 605 such as a micro projector. Further, external image information is delivered via an optical cable 607 conveying image information created by an external image creating (sending) device. The image projection device 605 serves as the mixed image output unit 312 shown in FIG. 3.

Figure 7:
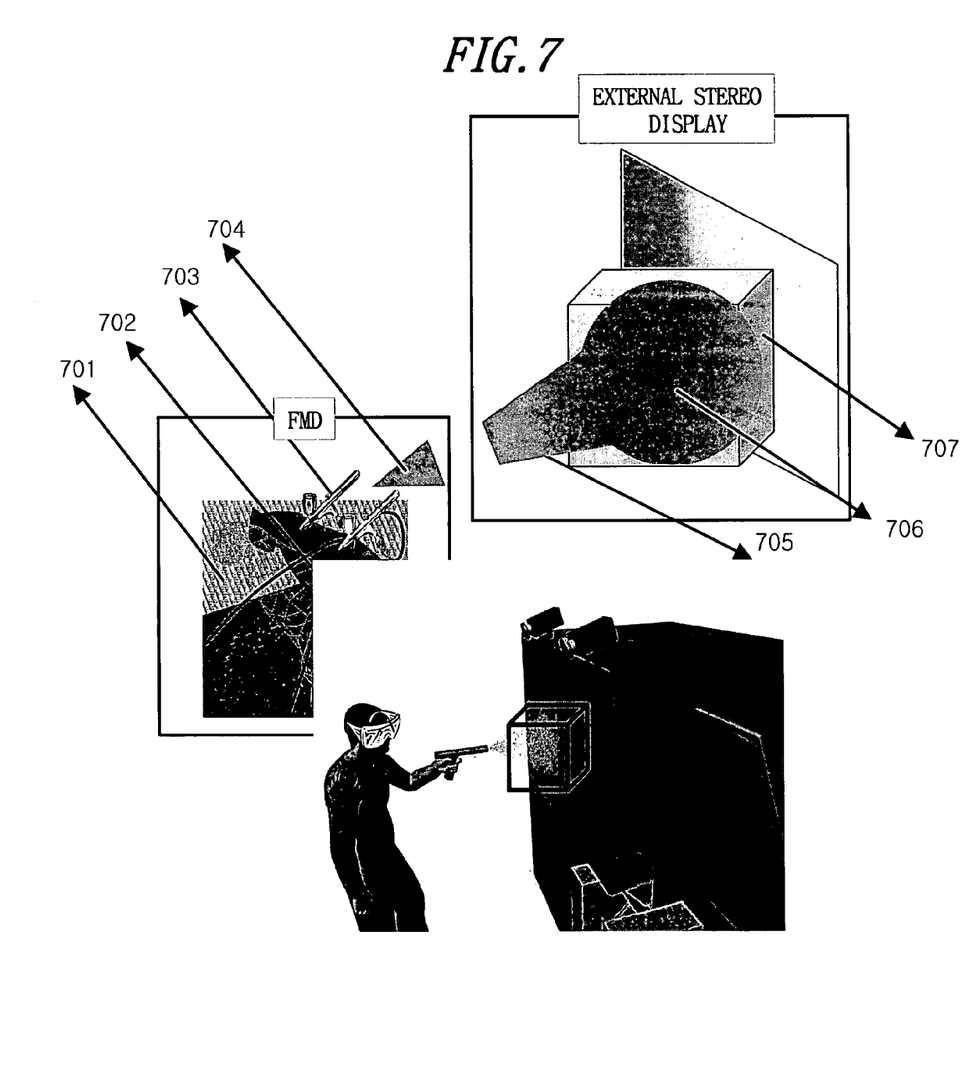
FIG. 7 describes an example where a virtual spray painting training system is implemented with the display apparatus for a mixed reality environment in accordance with the present invention.

FIG. 7 illustrates an example where a virtual spray painting training system is implemented by using the display apparatus in accordance with the present invention. An external artificial image is visualized by a large-sized rear surface projection type stereo image projection system so as to have a stereoscopic feeling for a painting target object. The mixed reality environment display apparatus that a user can wear allows the user to view an external virtual block and a jet appearance of virtual paint that is shot from his/her own spray gun, and to view information in which guide information guiding an accurate painting operation and the like are mixed naturally. Through the mixed reality environment display apparatus, the user can view his or her actual hand 701, virtual operation guide information 702, an actual spray painting tool 703, and a virtual paint spray 704 all at once. For instance, if the virtual paint spray 705 is sprayed on a virtual ship block 707 on an external stereo display screen, it can be seen through an area 706 that the virtual paint is painted where it is sprayed.

FIG. 8 exemplifies an example where the display apparatus for a mixed reality environment in accordance with the present invention is implemented as an interface apparatus of virtual reality game contents allowing a multiple user participation. Referring to FIG. 8, an external game space is visualized by a large-sized stereo image display system, and is observed simultaneously by users 1 and 2 participating in the game. In the display apparatus for which the user 1 playing the role of a hunter is wearing, stereo image information relating to weapons control is mixed with external image information and then visualized. In this case, the users 1 and 2 cannot view the counterpart's personal information, and the third party who participates in the game can view only the resultants externally appeared in a game world by the users' behaviors. Namely, as seen on a general multiple participation type game interface screen 801 in FIG. 8, it is possible to prevent information irrelevant to the users from being visualized on a shared screen to thereby cause no visibility confusion. Unlike the general game interface screen 801, virtual reality game contents 802 of the present invention provides a common stereo image of an external image and an internal image. If the users 1 and 2 play the game together, a personal control menu 803 for the user 1 is displayed on a display screen, and thus, the user 1 can choose game options through personal stereo images of the personal control menu 803. Similarly, the user 2 can also choose game options through his or her personal control menu. Further, the users 1 and 2 can view the external common stereo image 802 or the personal control menu 803 through their own multiple stereo image mixed presentation visual interface devices 804 and 805, respectively.

Figure 9:
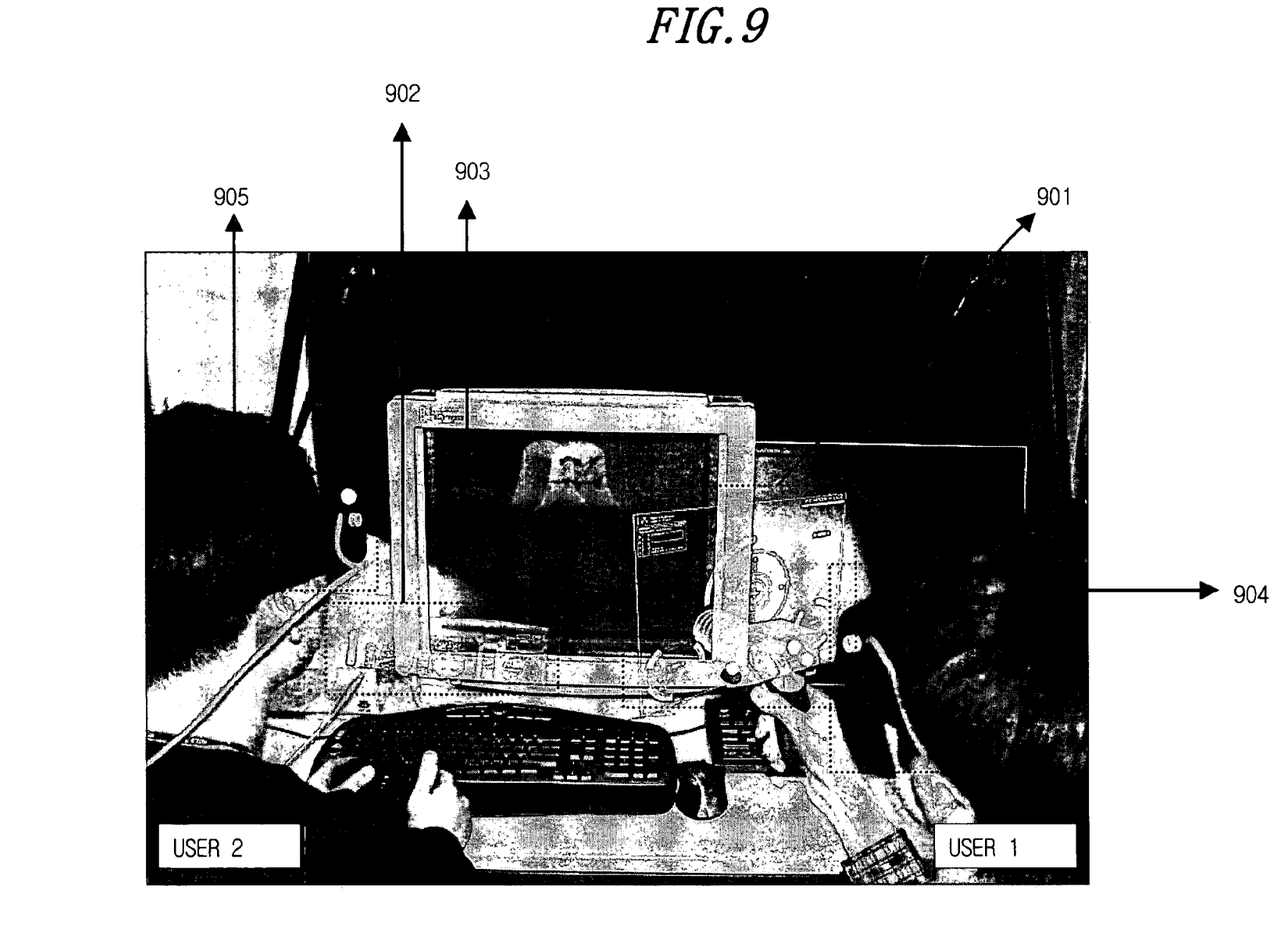
FIG. 9 presents an example where the display apparatus in accordance with the present invention is implemented as virtual reality game contents allowing a multiple user participation.

FIG. 9 illustrates an example where the display apparatus of the present invention is implemented as virtual reality game contents allowing a multiple user participation. An external artificial image 903 is visualized by a stereo monitor. The scenario in FIG. 9 is that two users who wear display apparatuses 904 and 905 having round polarizing filters for accepting the external artificial image attached thereto, explore a labyrinth as a driver and a hunter, respectively, and hunt ghosts. The user 1 (e.g., a hunter) is able to play the game under a mixed reality environment that external actual object information, an artificial image, and personal image information 901 visualized on his or her own display apparatus are naturally mixed. And, the user 2 (e.g., a driver) is able to view an external labyrinth space stereoscopically through an external environment presentation display apparatus, and manipulate the display apparatus while viewing driving dashboard information 902 relevant to himself/herself and a game joystick pad (actual object) to be actually manipulated.

Meanwhile, the preferred embodiments of the present invention as described above can be implemented by a software program that is stored in a computer-readable storage medium and can be executed in universal digital computers. Examples of the computer readable recording medium include a magnetic storage medium such as ROM, floppy disks, hard disks or the like, optical storage medium such as CD-ROMs or DVDs, and a storage medium such as a carrier wave, e.g., transmission over the Internet.

As a result, the present invention has an advantage that the stereo image presentation display apparatus for a mixed reality system can solve the existing drawbacks, occurred when a user uses an image apparatus independently, by proposing a scheme capable of mixing an external image and information created through the see-through function. In other words, while the prior art system has been implemented in such a way that external actual information and virtual information created by the display apparatus are integrated, the present invention can integrate and control all of external actual information, artificial image information, and external artificial image information.

Moreover, according to the present invention, virtual reality game contents allowing multiple user participation can be established in the entertainment field and a wide variety of applications are possible in the fields of job training or education in virtual environment, wearable computing, ubiquitous computing, and so on.

While the invention has been shown and described with respect to the preferred embodiments, it will be understood by those skilled in the art that various changes and modification may be made without departing from the spirit and scope of the invention as defined in the following claims.

What is claimed is:

1. A display apparatus for a mixed reality environment, comprising:
   an external image processor for mixing an actual image of an object around a user and a single or plurality of artificial stereo images artificially created to provide a multiple external image signal;
   a user information extractor for extracting the users visual information;
   an image creator for creating a stereo image signal based on the extracted user's visual information;
   an image mixer for synchronizing the multiple external image signal and the stereo image signal; and
   an image output unit for outputting the synchronized multiple external image signal and stereo image signal to the user for displaying thereof by use of a light source,
   wherein the user information extractor tracks eyes of the user without having a separate light source by use of the light source of the image output unit for outputting the synchronized multiple external image signal and stereo image signal to the user.

2. The display apparatus of claim 1, wherein the user information extractor includes a photographing unit for photographing an eye portion in order to extract the visual information; wherein the photographing unit directly photographs the eye portion or indirectly photographs the eye portion using light provided by an image capturing device.

3. The display apparatus of claim 1, wherein the image output unit separates the mixed image signal into left and right viewing channels and outputs separated signals.

4. The display apparatus of claim 1, wherein the display apparatus is a face-mounted display (FMD) apparatus.

5. The display apparatus of claim 1, wherein the external image processor separates the mixed signal into left and right viewing channels and outputs separated signals.

6. The display apparatus of claim 1, wherein the external image processor has a see-through scheme in which an external light corresponding to the actual image and the stereo images is transmitted therethrough.

7. The display apparatus of claim 6, wherein the external image processor further includes a light transmission amount regulator for selectively regulating a transmittance amount of the transmitted external light.

8. The display apparatus of claim 1, wherein the external image processor includes a camera for photographing the actual image of the object and the stereo images.

9. The display apparatus of claim 1, wherein the image mixer separates the external image signals into layered spaces, in a depth direction on the basis of the stereo image signal, in order to visualize the multiple external image signals and the stereo image signal, which have been visualized on different three-dimensional spaces, on one three-dimensional space.

10. The display apparatus of claim 1, wherein the display apparatus is used in a virtual work scenario and environment.

11. The display apparatus of claim 1, wherein the display apparatus is used for multiple user participation type virtual reality game contents.

* * * * *